United States Patent [19]

Van Exel

[11] 4,281,890

[45] Aug. 4, 1981

[54] OPTICAL ADJUSTMENT KNOB FOR BINOCULAR

[75] Inventor: Gerrit A. Van Exel, Fullerton, Calif.

[73] Assignee: Bausch & Lomb Incorporated, Rochester, N.Y.

[21] Appl. No.: 23,316

[22] Filed: Mar. 23, 1979

[51] Int. Cl.³ .............................................. G02B 7/06
[52] U.S. Cl. ........................................ 350/77; 350/44
[58] Field of Search .............................. 350/44, 76, 77

[56] References Cited

U.S. PATENT DOCUMENTS

| | | | |
|---|---|---|---|
| 477,360 | 6/1892 | Glocker | 350/74 |
| 4,030,808 | 6/1977 | Hornschu et al. | 350/44 X |
| 4,066,329 | 1/1978 | Van Exel | 350/44 X |

FOREIGN PATENT DOCUMENTS 53-35045  3/1978  Japan .

*Primary Examiner*—Conrad J. Clark
*Assistant Examiner*—Matthew W. Koren
*Attorney, Agent, or Firm*—Christie, Parker & Hale

[57] ABSTRACT

A binocular having a treadle-like knob which is coupled to optical elements to effect an adjustment such as focusing or varying the magnification of the optical system. The knob is mounted to be moveable in seesaw fashion about an axis which is generally perpendicular to the optical axes of the telescopes which form the binocular. This arrangement is especially useful in relatively small binoculars which may be held in one hand, the knob being driven by the tips of two fingers on the supporting hand.

6 Claims, 9 Drawing Figures

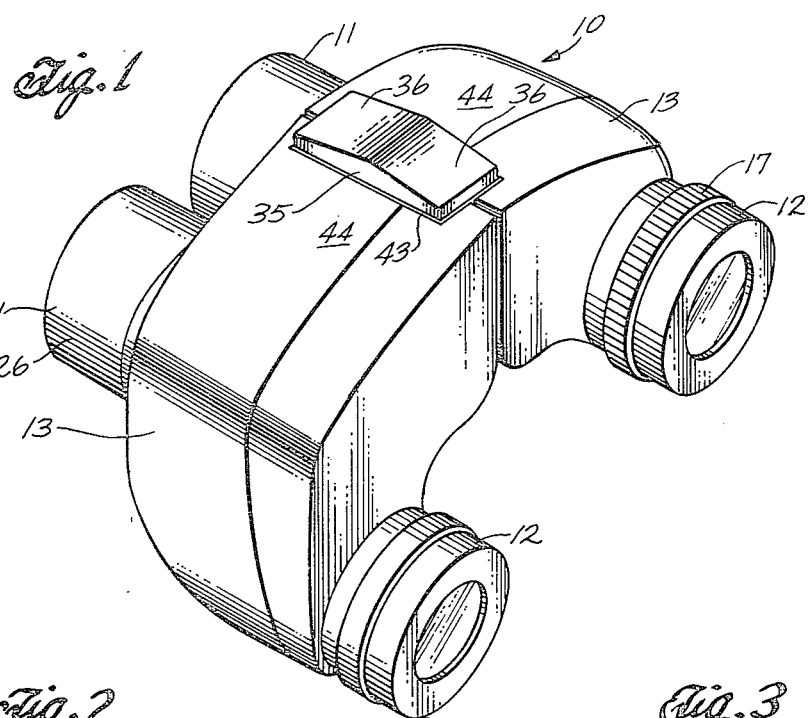
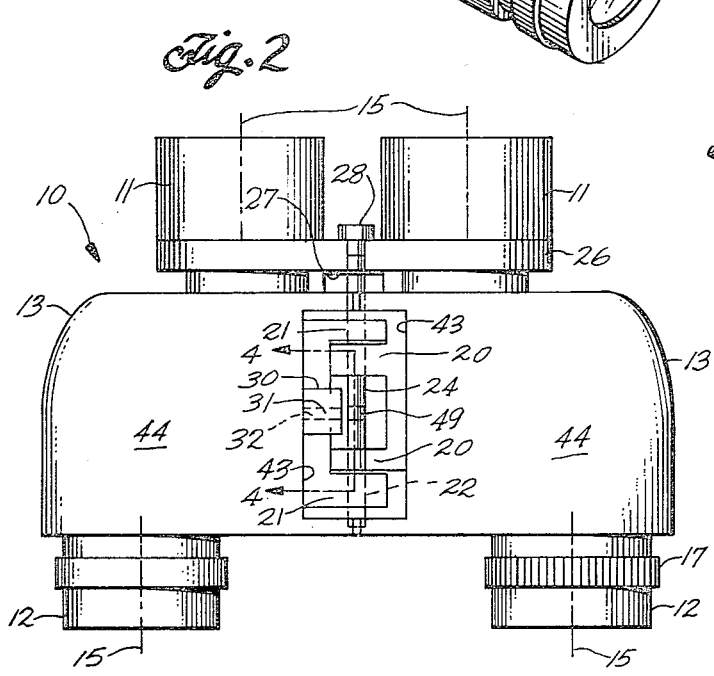
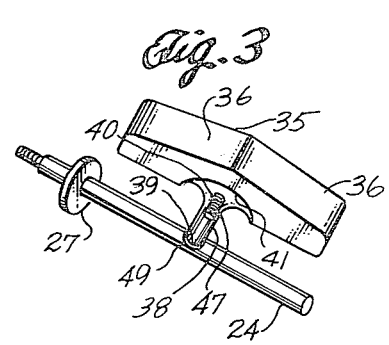
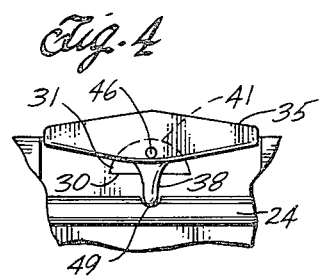

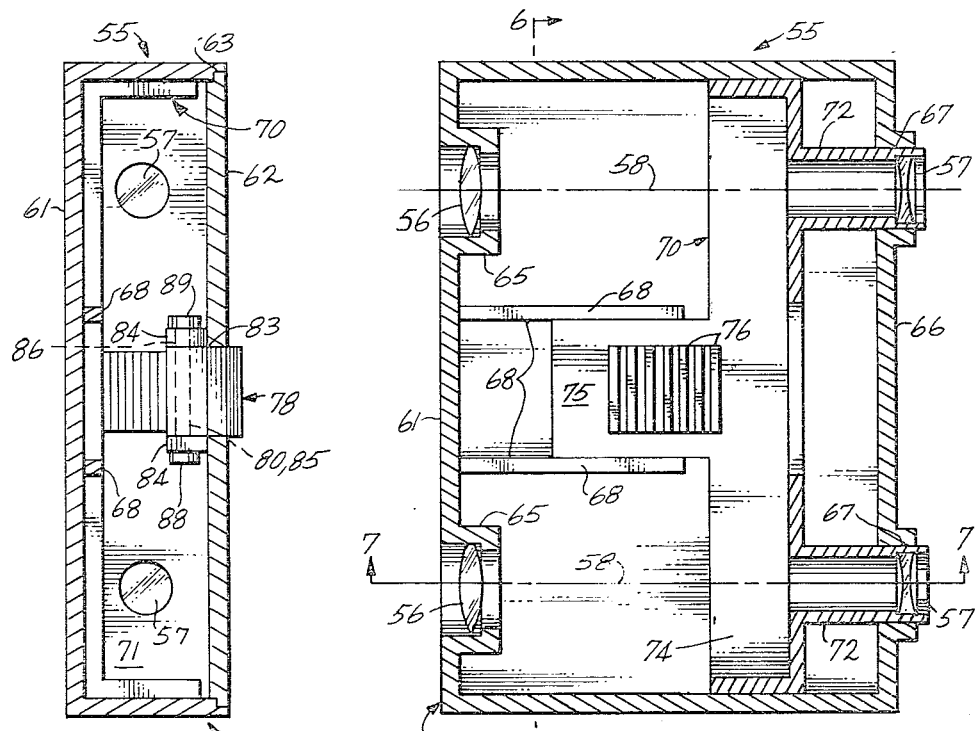

OPTICAL ADJUSTMENT KNOB FOR BINOCULAR

BACKGROUND OF THE INVENTION

A conventional optical binocular has a pair of monocular telescopes which are coupled together by a supporting frame, the frame commonly including a center hinge to enable adjustment of the interpupillary spacing of ocular or eyepiece lenses of the telescopes. In conventional instruments of this type, sharp focus of the image of an object being viewed is achieved by rotating individual focus rings on the two eyepieces, or by rotating a center-focus wheel which is coupled to both telescopes.

Several embodiments of an important advance in binocular design are shown in U.S. Pat. Nos. 3,540,792 and 4,066,329, the disclosures of which are incorporated herein by reference. These improved designs provide a short-stroke focus knob which permits simple and rapid focusing of the image. As explained in detail in the aforementioned patents, a fast-focus mechanism enables more accurate focus adjustment, and has been found to provide a natural and comfortable way for binocular users to achieve optimum viewing of objects at varying ranges.

In U.S. Pat. No. 4,066,329, there is disclosed a center-focus binocular having a short-stroke treadle or seesaw knob which is mounted to be rotatable about an axis which is generally parallel to the optical axes of the telescopes. The improved knob herein disclosed is similar in many respects to the aforementioned knob, but the new knob is mounted to rotate about an axis which is perpendicular rather than parallel to the telescope optical axes. The new arrangement has been found to be especially suitable for relatively small binoculars which may be held in only one hand, and the knob is easily actuated in rocker fashion by two fingertips while the object of interest is being viewed.

SUMMARY OF THE INVENTION

Briefly stated, this invention relates to a binocular assembly having a housing supporting a pair of telescopes with moveable optical elements for making an optical adjustment. The telescopes have generally parallel optical axes along which images of an object are viewed, and the housing has an upper surface when the binocular is held in a normal viewing position.

The invention contemplates an improved adjustment mechanism for a binocular of this style, the mechanism including an adjustment knob which is movably mounted on the housing or internal frame to be rotatable about an adjustment axis which is generally parallel to an imaginary line connecting and perpendicular to the telescope optical axes. The knob has a pair of finger-contacting portions or platforms which are radially spaced from and angularly spaced apart with respect to the adjustment axis. The finger-contacting portions are positioned adjacent the housing upper surface so the knob can be rotated bidirectionally in seesaw fashion by a pair of fingers positioned over the upper surface and in contact with the knob portions. A coupling means is provided to connect the knob to the moveable optical elements for shifting the elements in response to knob rotation.

Preferably, the finger-contacting platforms are spaced apart in a fore-and-aft direction at least three-fourths inch to insure that the platforms can be comfortably contacted by adjacent fingertips. The included angle defined between the knob rotation axis and the platforms is no less than 45 degrees, and is preferably in the range of 90 degrees or more.

BRIEF DESCRIPTION OF THE DRAWINGS

FIG. 1 is a pictorial view of a prism binocular incorporating the invention;

FIG. 2 is a top view of the binocular shown in FIG. 1, the adjustment knob being removed to show certain internal components;

FIG. 3 is a pictorial view of the adjustment knob and a bridge pin;

FIG. 4 is a view on line 4—4 of FIG. 2 with the knob in a centered position;

FIG. 5 is a top sectional view of an alternative embodiment of a binocular using Galilean telescopes, the top cover of the instrument being removed;

FIG. 6 is a view on line 6—6 of FIG. 5;

FIG. 7 is a view on line 7—7 of FIG. 5;

FIG. 8 is a pictorial view of a carrier used to support moveable optical elements in the instrument; and FIG. 9 is a pictorial view of an adjustment knob.

DESCRIPTION OF THE PREFERRED EMBODIMENT

Referring to FIGS. 1–2, a prism-type binocular 10 has a pair of monocular telescopes each of which includes an objective lens housing 11 and an ocular lens housing 12 mounted at opposite ends of an enclosed frame or body 13. Each telescope further includes a prism (not shown) mounted within the respective body, and the optical axes of the ocular and objective lenses of each telescope are shown in FIG. 2 by dashed lines 15. The prisms are reversed from the normal position, used in a prism binocular such that the objective lenses are closer to each other than the eyepiece lenses to provide a small overall housing size.

As is conventional in instruments of this type, one of the ocular lens housings includes an individual eyepiece focus ring 17 which can be adjusted to compensate for any dioptric difference between the user's eyes. As best seen in FIG. 2, the two bodies of the monocular telescopes are centrally hinged by interfitted bracket members 20 and 21. A central bore 22 is formed through the bracket members, and an axially moveable bridge pin 24 makes a slip fit in bore 22 to secure the bracket members together. The monocular telescopes can thus be hinged together or away from each other to adjust the interpupillary spacing of the ocular lenses.

Focusing of a prism binocular can be achieved by moving either the ocular or objective lenses along their respective optical axis. The instrument shown in FIGS. 1 and 2 is arranged for focusing by moving the objective lenses which are supported in housings 11.

The two objective lens housings are coupled together by a bridge member 26 which is seated against a flange 27 adjacent one end of bridge pin 24. This end of the bridge pin projects through a bore in the bridge member to mate with a locking nut 28 as shown in FIG. 2. The two ocular lenses, bridge member, and bridge pin thus move axially as a unit, but the ocular lens housings can rotate about the bridge pin during adjustment of the interpupillary spacing of the telescopes.

A central portion of one of the telescope bodies includes a boss 30 which extends laterally toward the center line of the instrument. The boss has a cylindrically curved upper surface 31, and a threaded opening 32 extends into the boss.

A rocker or seesaw focus knob 35 is elongated in a direction parallel to optical axes 15, and defines a pair of spaced-apart finger-contacting platforms 36 on its upper surface. An actuating tab 38 extends downwardly from the under surface of the knob to terminate in a rounded tip 39. A laterally extending bore 40 is formed through the upper end of tab 38, and a cylindrically curved recess 41 extends over bore 40 into one of the side surfaces of the knob.

During assembly of the binocular, knob 35 is fitted into a clearance slot 43 in the central part of upper surfaces 44 of the telescope bodies. The curved upper surface of boss 30 fits into recess 41 at one side of the knob to form a partial bearing surface for the knob. A shaft 46 having a threaded end 47 is then inserted through bore 40 in the knob, and the shaft end is threaded into mating opening 32 in the boss. The shaft thus rotatably supports the knob, and serves as an axle about which the knob can be rotated.

When the parts are assembled in this fashion, rounded tip 39 of actuating tab 38 on the knob is received in a lateral slot 49 formed in the upper surface of a central part of bridge pin 24. When the focus knob is rotated bidirectionally within a limited range, the tip of the actuating tab drives the bridge pin in a direction parallel to optical axes 15, and the bridge pin in turn drives the bridge member to vary the spacing of the objective lenses from the associated eyepiece lenses to focus the instrument.

Another style of a binocular 55 incorporating the invention is shown in FIGS. 5–9. This instrument uses a pair of Galilean telescopes, each of which has a positive objective lens 56 and a negative ocular or eyepiece lens 57, the lenses of each telescope being on an optical axis 58. Binocular 55 is designed as a simple and inexpensive instrument which does not incorporate more elaborate features such as variable interpupillary spacing of the eyepiece lenses.

The components of binocular 55 are supported in a housing 60 having a base 61 and a cover 62 which are secured together at a joint 63. Objective lenses 56 are positioned in mounting cell 65 formed in the base, and conventional retaining elements for these lenses are omitted for clarity in the drawings. A rear wall 66 of the base defines a pair of cylindrical openings 67 to receive eyepiece-lens tubes as described below, and the floor of the base includes a pair of laterally spaced upstanding tracks or ribs 68 which extend in a direction parallel to optical axes 58.

An eyepiece carrier frame 70 includes an upstanding rear wall 71 having a pair of laterally spaced lens-mounting tubes 72 extending rearwardly therefrom. Ocular lenses 57 are mounted in the rear ends of these tubes, and the details of conventional retainers used to secure the lenses in place are omitted from the drawings for clarity.

Carrier frame 70 has a base 74 which extends generally perpendicularly and forwardly from the lower end of rear wall 71, and a tab 75 extends forwardly from a central part of base 74. A plurality of upstanding teeth 76 defining a rack gear are formed on the upper surface of the tab.

A rocker or seesaw knob 78 (best seen in FIG. 9) has a pair of finger-contacting platforms 79 which are spaced apart in a direction parallel to the optical axes of the binocular telescopes. A bore 80 extends laterally through the knob in a direction perpendicular to the optical axes, and a cylindrically curved undersurface of the knob defines a plurality of teeth 81 forming a pinion gear, the teeth being spaced and shaped to mate with teeth 76 on the tab of the eyepiece carrier frame.

A slot 83 is formed in the central part of housing cover 62, and the upper part of knob 78 is fitted through the slot as shown in FIGS. 6 and 7. A pair of integrally formed supporting lugs 84 extend downwardly from the inner surface of base cover 62 on opposite sides of slot 83, and a shaft 85 is passed through bore 80 in the knob and alligned openings 86 in lugs 84 to mount the knob rotatably on the housing cover. The shaft has an enlarged head 88 at one end, and includes threads at its opposite ends to mate with a retaining nut 89.

When the instrument is assembled, pinion-gear teeth 81 of the knob mate with rack-gear teeth 76 on the eyepiece carrier frame as best seen in FIG. 7. Depression of either of finger-contacting platform 79 will accordingly rotate the knob, driving the eyepiece carrier frame forwardly or rearwardly in a direction parallel to the optical axes of the telescopes, thereby providing a focus adjustment for the binocular. The carrier frame is guided within the binocular housing by tubes 72 which make slip fits through openings 67 in the rear wall of the housing base, and by tab 75 which makes a slip fit between ribs 68 on the housing base.

The adjustment knobs used in the several binocular embodiments described above have a number of common features which characterize these improved designs. Each knob has a pair of finger-contacting platforms or surfaces which are spaced apart "fore and aft" in a direction parallel to the optical axes of the objective and eyepiece lenses. This enables the platforms to be contacted by the tips of the forefinger and middle finger of the hand which is supporting the binocular, and the knob can easily be "rocked" in a bidirectional action to achieve a rapid and accurate focus setting. The binocular is of course also adapted for a two-handed grip, and the knob can be driven by one finger on each of the two hands at the option of the user.

The knob platforms are sufficiently spaced apart in a fore-and-aft direction that adjacent fingertips can comfortably contact these surfaces during focus adjustment. A minimum spacing of the centers of these surfaces by about three-fourths inch to one inch is preferred to insure comfortable operation of the focus control.

Another important feature of the knob is to provide a relatively large included angle from the knob rotation axis to the approximate centers of platforms 79 where the tips of the user's fingers contact the knob. This included angle is illustrated as angle A in FIG. 7, and it is greater than 45° degrees, and preferably in the range of 90° degrees or more. The use of a large included angle between these surfaces provides adequate leverage about the rotation axis for smooth focus operation, and also insures that the dominant motion of the fingertips is a bidirectional linear "up and down" motion, rather than a circumferential movement about the knob axis of rotation.

In the specific embodiments described above, the knob is coupled to moveable optical elements in the binocular by a tab or rack-and-pinion arrangement which converts rotary movement into a linear driving motion. Other coupling arrangements such as cams or the like can also be used to couple the knob to the lenses, and several alternative systems are shown in the two patents cross-referenced in the preamble to this disclosure. Although described in terms of a focus adjustment, it should also be noted that the fore-and-aft seesaw or rocker knob herein disclosed is equally useful for effecting other kinds of optical adjustments such as varying magnification in a "zoom" binocular.

I claim:

1. In a binocular assembly having a housing supporting a pair of telescopes having moveable optical elements to effect an optical adjustment, the telescopes having generally parallel optical axes along which images of an object are viewed, the housing having an upper surface when the binocular is held in a normal viewing position; an improved adjustment mechanism comprising:

an adjustment knob movably mounted on the housing to be rotatable about an axis which is generally parallel to an imaginary line connecting and perpendicular to the optical axes, the knob having an exposed upper portion defining a pair of finger-contacting platforms which are radially spaced from and angularly spaced apart with respect to the adjustment axis, the knob platforms being positioned adjacent the housing upper surface so the knob can be rotated bidirectionally in seesaw fashion by a pair of fingers positioned over the upper surface and in contact with the knob platforms, the knob apart from the exposed upper portion being enclosed in the housing; and a coupling means connecting the knob to the moveable optical elements for shifting the elements along the respective optical axes in response to rotation of the knob.

2. The improvement defined in claim 1, wherein an included angle from the adjustment axis to centers of the two platforms is at least about 45 degrees, and wherein the housing is a substantially rigid non-hinged member.

3. The improvement defined in claim 2 wherein the included angle is more than approximately 90 degrees.

4. The improvement defined in claim 2 wherein the moveable optical elements are focusing elements.

5. The improvement defined in claim 4, wherein the knob includes a radially extending tab, within the housing the adjustment axis being between the tab and the platforms, and the coupling means includes an elongated moveable pin connected to the optical elements and engaged with the tab to drive the pin and optical elements linearly in response to rotary movement of the knob.

6. The improvement defined in claim 4, wherein the knob has an undersurface portion within the housing and defining a plurality of teeth forming a pinion gear, and the coupling means defines a plurality of teeth forming a rack gear in engagement with the pinion gear to convert rotational movement of the knob into linear movement of the coupling means and associated optical elements.

* * * * *